Jan. 30, 1962 W. H. SAYLOR 3,019,421

HELICAL MAGNETIC STORAGE ASSEMBLY

Filed Feb. 7, 1958

INVENTOR
WILLIAM H. SAYLOR
BY Henry L. Shenier
ATTORNEY

United States Patent Office 3,019,421

Patented Jan. 30, 1962

3,019,421

HELICAL MAGNETIC STORAGE ASSEMBLY

William H. Saylor, Altadena, Calif., assignor, by mesne assignments, to United Aircraft Corporation, East Hartford, Conn., a corporation of Delaware Filed Feb. 7, 1958, Ser. No. 713,907
4 Claims. (Cl. 340—174.1)

My invention relates to a helical magnetic storage assembly and more particularly to a device for storing a large amount of information while permitting rapid access to any of the stored information.

In the prior art means are known for storing information in the form of binary bits and the like in a magnetic medium. Devices of the prior art for storing such information assume various forms depending upon the amount of information to be stored and the necessity for rapid access to any of the stored information.

Magnetic tape known in the prior art has the advantage of being capable of storing a very large amount of information in a small space with the tape in its rolled-up condition. With magnetic tape, however, in order to gain access to information stored at a particular point along the length of the tape the tape must be unreeled until the point at which the information is stored arrives at the sensing or pickup head. It will be seen that while magnetic tape provides a means for storing a very large amount of information in a small space it does not permit ready access to information stored at any point along the length of the tape.

Drums and disks having magnetizable surfaces are known in the prior art for storing information. With these storage devices a sensing head may rapidly be moved to any point on the surface of the storage device to sense the information stored at that point. Thus, these devices afford ready access to information stored at any point on the recording surface. While accomplishing this desirable result drums and disks have a limited surface area for storage with the result that only a relatively small amount of information can be stored relative to the space occupied by the storage device.

I have invented a helical magnetic storage assembly for storing a relatively large amount of information in a small space while permitting rapid access to information stored at any point on the recording surface. My device permits a sensing head to be moved rapidly to any point on the recording surface without traversing the entire recording path. My device is simple in construction and in operation.

One object of my invention is to provide a helical magnetic storage assembly which stores a large amount of information in a relatively small space, while permitting ready access to information stored at any point on the recording surface.

A further object of my invention is to provide a helical magnetic storage assembly which permits access to information stored at any point on the recording surface without the necessity of passing the pickup head or the like over the entire recorded path to the point at which information is to be picked up.

Still another object of my invention is to provide a helical magnetic storage assembly which is simple in construction and in operation.

Other and further objects of my invention will appear from the following description.

In general, my invention contemplates the provision of a recording surface in the form of a continuous spiral surface provided with means for rotating the surface. My device includes a magnetic detector head and a first drive for moving the head in the direction of the axis of the spiral to traverse the surface of the spiral as the spiral surface rotates. My device also includes means for moving the sensing head inwardly and outwardly of the surface spiral. I provide means for disengaging the head from its first drive and for rapidly moving the head to a position at which it may be inserted into the spiral to read information stored any point on the spiral surface.

In the accompanying drawings which form part of the instant specification and in which like reference numerals are used to indicate like parts in the various views.

Figure 1:
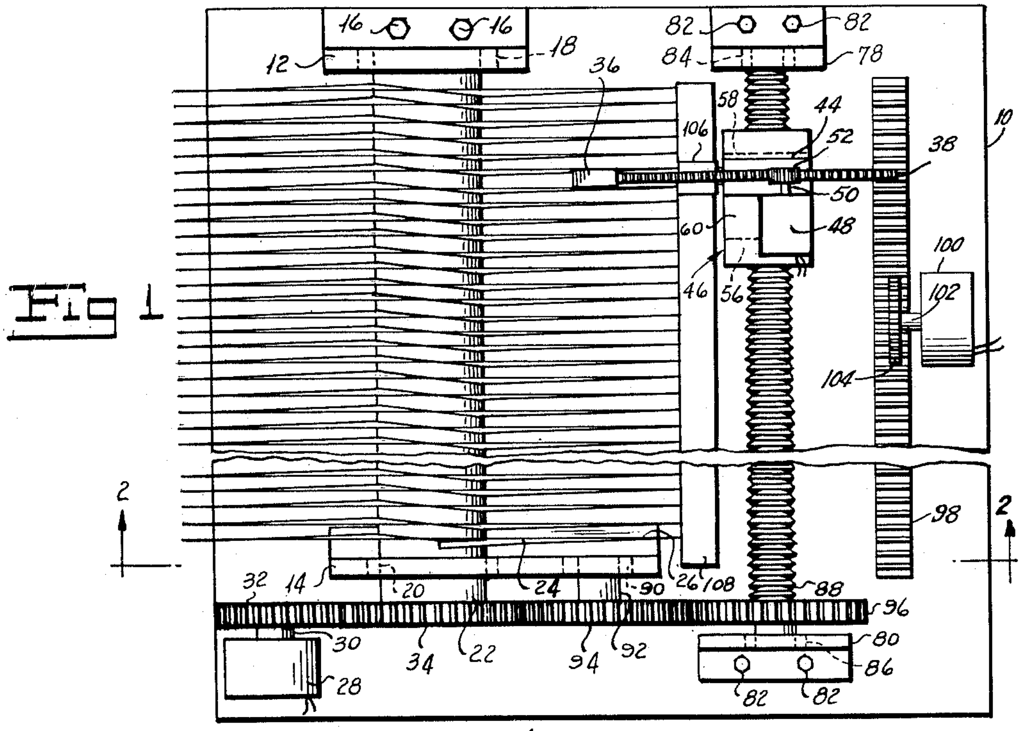
FIGURE 1 is a plan view of my helical magnetic storage assembly.

Referring now more particularly to the drawings, my helical magnetic storage assembly includes a support platform or table 10 on which I mount respective bearing supports 12 and 14 by any convenient means such as bolts 16 or the like. Respective bearings 18 and 20 carried by supports 12 and 14 rotatably support a tube 22. I spirally wind a sheet 24 of material provided with a recording surface 26 around the tube 22 between the supports 12 and 14. As is readily apparent from FIGURE 1 of the drawings I wind the sheet 24 around tube 22 with one edge of the sheet in engagement with the surface of tube 22 along the length of the sheet 24. It will be seen that in so winding the sheet 24 around tube 22 I have generated a continuous spiral surface 26 on which information in the form of, for example, binary bits may be recorded. Sheet 24 may itself be formed of a magnetic material such as a steel alloy or, if desired, it may be a sheet of paper or plastic, the surface of which carries a coating of a powdered magnetic material such, for example, as black magnetic iron oxide.

A motor 28 carried by the support 10 drives a shaft 30 carrying a gear 32 for rotation with the shaft. I mount a gear 34 on tube 22 for rotation with the tube. When motor 28 is energized it drives shaft 30 to drive the gear 34 to rotate tube 22 and the spiral surface 26 carried by the tube.

My device includes a sensing head 36 adapted to be moved as the spiral surface 26 is driven to read the information carried on the surface 26. I mount head 36 by any convenient means on a rack 38 having a dovetail 40 disposed in a complementary dovetail groove 42 formed in a block 44 supported on a carriage, indicated generally by the reference character 46. A motor 48 supported on the carriage 46 is adapted to be energized to drive a shaft 50 carrying a pinion 52 for rotation with the shaft. When motor 48 is energized to drive its shaft 50 pinion 52, which engages the teeth of the rack 38, rotates to move head 36 inwardly or outwardly depending upon the direction of rotation of shaft 50.

Figure 2:
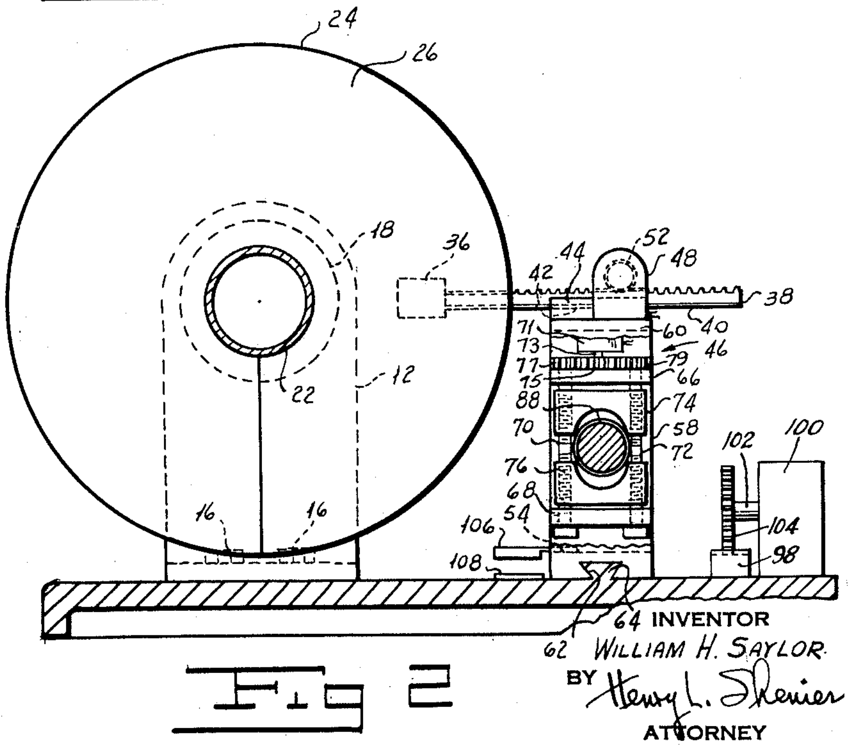
FIGURE 2 is a sectional view of my helical magnetic storage assembly taken along the line 2—2 of FIGURE 1.

Carriage 46 includes a base 54 connected by respective legs 56 and 58 to the top 60 which supports motor 48 and block 44. I form base 54 with a dovetail groove 62 supported on a complementary dovetail guideway 64 carried by support 10. It will be appreciated that if I drive carriage 46 dovetail 64 guides the carriage to move along a path which is parallel to the axis of tube 22. Respective brackets 66 and 68 carried by leg 58 rotatably support a pair of threaded studs 70 and 72. A split nut has a pair of halves 74 and 76 carried by the studs 70 and 72. As can be seen by reference to FIGURE 2, the half 74 is disposed on the upper halves of studs 70 and 72 as viewed in the figure, while the half 76 is disposed on the lower halves of the studs as viewed in the figure. I oppositely thread the respective upper and lower halves of each of studs 70 and 72 carrying the nut halves 74 and 76. A drive motor 71 carried by top 60 has a shaft 73 carrying a pinion 75 which drives gears 77 and 79 carried by the studs 70 and 72 for rotation with the studs. Rotation of shaft 73 drives studs 70 and 72 in opposite directions. I so thread the studs that rotation of shaft 73 in one direction draws the nut halves 74 and 76 together and rotation of shaft 73 in the other direction moves the nut halves away from each other.

Respective support plates 78 and 80 secured to the table 10 by means such as bolts 82 carry respective bearings 84 and 86 which rotatably support a drive screw 88 which passes between the halves 74 and 76 of the split nut of my device. In one direction of rotation of shaft 73 nut halves 74 and 76 move toward each other to engage drive screw 88. With the split nut halves 74 and 76 in engagement with screw 88 the screw is adapted to drive the carriage 46 along the guideway 64. With the split nut halves 74 and 76 moved out of engagement with drive screw 88 carriage 46 may be moved rapidly parallel to the axis of tube 22 in a manner to be described.

Bearing support 14 carries a bearing 90 which rotatably supports a stub shaft 92 which carries a gear 94 for rotation with the shaft. Gear 94 meshes with gear 34 and with a gear 96 carried by drive screw for 88 rotation with the screw. I select the pitch of screw 88 to be equal to the pitch of the spiral surface 26 formed by the sheet 24. It will be appreciated that when motor 28 is energized to drive the surface 26 in the manner described hereinabove gears 94 and 96 drive screw 88 to advance carriage 46 and the detecting head 36 supported on the carriage in a direction parallel to the axis of tube 22. In this manner, as the spiral surface rotates, head 36 is driven to traverse the surface of the spiral. Motor 48 may drive the head 36 to move it into registry with one of the other spiral tracks carried by the surface 26.

As has been explained hereinabove, it may be desirable to move head 36 rapidly from one location to another location on the surface 26. It is desirable that this be accomplished without requiring the head to traverse the entire spiral track between the point it occupies and the point at which the desired information is stored. I secure a rack 98 to the base 54 of carriage 46 by any convenient means such as welding or the like. Table 10 supports a motor 100 adapted to be energized to drive a shaft 102 on which I mount a pinion 104 for rotation with the shaft. When motor 100 drives shaft 102 pinion 104 drives rack 98 to move carriage 46 rapidly in a direction parallel to the axis of the helical surface 26. It will be understood that before driving the carriage in this manner I energize motor 48 to withdraw the head 36 from the spiral surface 26 and energize motor 71 to move nut halves 74 and 76 out of engagement with screw 88.

A sensing head 106 carried by the base 54 of carriage 46 registers with a magnetic track 108 on support 10. I make a digital record on track 108 to provide a method of indexing the head 36 along the spiral axis by sensing the carriage position through detector head 106.

In constructing my device I may, for example, select a tube 22 having a diameter of 5 inches and a length of 50 inches. I next take a sheet 24 and wind it around the tube 22 in the manner described with its surface extending about 10 inches radially outwardly from the tube in all directions. Such a device may, for example, have five spirals per inch of length of tube 22 or 250 spirals. If only the outboard three inches of the surface are used for recording then the recording area is $(12.5)^2\pi-(9.5)^2\pi=206$ inches per spiral. If both sides of sheet 24 are used for recording then the total available recording surface is $2\times250\times306=103{,}000$ square inches. Assuming a recording density of 15 tracks per inch and 200 pulses per inch of track the total number of pulses per square inch is $15\times200=3{,}000$ pulses per square inch. With these dimensions the total number of bits which may be stored in my device is $3{,}000\times103{,}000=309{,}000{,}000$ bits. It will be seen that my device stores a very large amount of information in a relatively small space. It will be appreciated that one form of recording track may describe a continuous spiral along the surface 26.

In operation of my helical magnetic storage assembly if I desire to read one of the spiral tracks continuously I first move head 36 to the beginning of the track and then actuate studs 70 and 72 to move the nut halves 74 and 76 into engagement with screw 88. I then energize motor 48 to move head 36 into the spiral over the track I desire to read. With the head properly positioned I energize motor 28 to drive shaft 30 and gears 32, 34, 94 and 96 to rotate the spiral surface 26 and to drive screw 88 to advance head 36 in a direction parallel to the axis of the spiral surface as the surface rotates. In this manner I may continuously read any one of the tracks recorded on the surface 26.

If I desire to move head 36 rapidly from the position it occupies to a position at which it is desired to pick up certain information I operate studs 70 and 72 to move out of engagement with screw 88. I withdraw head 36 from the spiral and energize motor 100 to drive rack 98 to move carriage 46 to a location corresponding to the location at which the desired information is stored. I next operate motor 48 to move head 36 into the spiral to the location at which the desired information is recorded. As has been explained hereinabove, sensing head 106 reads track 108 to permit proper indexing of head 36.

It will be seen that I have accomplished the objects of my invention. I have provided a helical magnetic storage assembly which stores a large amount of information in a relatively small space while permitting rapid and expeditious access to information stored at any point on the recording surface. My device permits access to be had to any point on any recorded track without the necessity of traversing the track from the point at which the head is located to the point at which the desired information is recorded. My storage register is simple in construction and in operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A helical magnetic storage assembly including in combination a support, means providing a continuous helical recording surface on which a magnetic track may be recorded, said surface being generated by rotating a straight line extending outwardly from an axis and making an angle greater than zero with the axis while advancing the line along the axis, means for rotatably supporting said surface on said support, detecting means, means for mounting said detecting means on said support to register with said track, means for rotating said surface, means responsive to said surface-providing means, said last-named means comprising disengageable means adapted to release said head from said surface-rotating means and auxiliary drive means for moving said head in a direction parallel to the axis of said surface-providing means.

2. A helical magnetic storage assembly as in claim 1 including means for sensing the position of said detecting means.

3. A helical magnetic storage assembly including in combination a support, means providing a continuous spiral surface formed of magnetizable material on which a magnetic track may be recorded, said surface being generated by rotating a line forming an angle with an axis about said axis while advancing said line along said axis whereby said spiral surface has a given pitch, means mounting said surface on said support for rotation about the axis of the spiral surface, a sensing head, means mounting said head on said support to register with said track, means for driving said surface-providing means, means for moving said head along a path parallel to the axis of said spiral surface as said surface rotates and means for positioning said sensing head radially along said spiral surface.

4. A helical magnetic storage assembly including in combination a support, means providing a continuous spiral surface formed of magnetizable material on which a magnetic track may be recorded, said surface being generated by rotating a line forming an angle with an axis about said axis while advancing said line along said axis whereby said spiral surface has a given pitch, means mounting said surface on said support for rotation about the axis of the spiral surface, a sensing head, means mounting said head on said support to register with said track, means for driving said surface-providing means, means for moving said head along a path parallel to the axis of said spiral surface as said surface rotates and means for sensing the position of said sensing head.

References Cited in the file of this patent

UNITED STATES PATENTS

| | | |
|---|---|---|
| 573,606 | Lougee | Dec. 22, 1896 |
| 900,392 | Kirkegaard | Oct. 6, 1908 |
| 2,175,388 | Gurley | Oct. 10, 1939 |
| 2,229,293 | Huntley et al. | Jan. 21, 1941 |
| 2,394,972 | Beach et al. | Feb. 19, 1946 |
| 2,431,739 | Eilenberger | Dec. 2, 1947 |
| 2,650,830 | Potter | Sept. 1, 1953 |
| 2,690,913 | Rabinow | Oct. 5, 1954 |
| 2,706,118 | Camras | Apr. 12, 1955 |
| 2,811,709 | Haselton et al. | Oct. 29, 1957 |
| 2,844,665 | Mann | July 22, 1958 |
| 2,852,761 | Hagopian | Sept. 16, 1958 |

FOREIGN PATENTS

| | | |
|---|---|---|
| 770,269 | Great Britain | Mar. 20, 1957 |

OTHER REFERENCES

"Engineering Design of a Magnetic-Disc, Random-Access Memory" (Noyes et al.), IBM Technical Publication, Dec. 11, 1957, pages 1–5 and FIGS. 1–4.